Patented Nov. 20, 1934

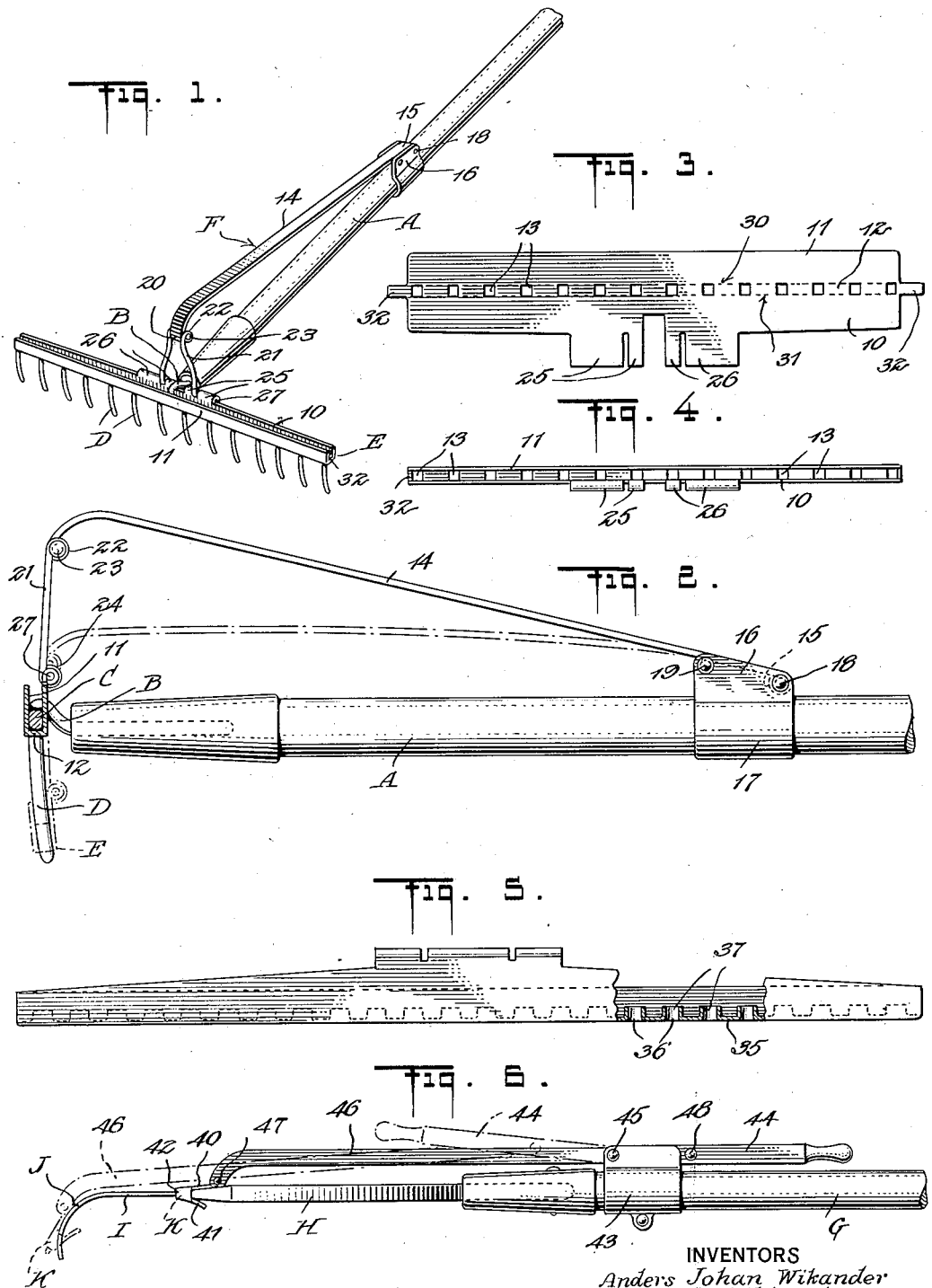

1,981,488

UNITED STATES PATENT OFFICE 1,981,488

RAKE CLEANING DEVICE

Anders Johan Wikander and Herbert Edvard Ohrn, Brooklyn, N. Y.

Application July 26, 1933, Serial No. 682,171

3 Claims. (Cl. 55—146)

This invention provides a device for cleaning the teeth of hand rakes to facilitate the stripping therefrom of leaves or grass or other material which gather on and between the rake teeth and tend to clog the rake.

The invention broadly comprehends a tooth cleaner for hand rakes provided with means manually movable with reference to the teeth from the bases to the outer free ends thereof so as to facilitate the displacement of leaves, grass or other material therefrom.

The invention more specifically resides in a device of the character described in which the stripper means is in the form of a cross sectionally U-shaped or channel-shaped member presenting walls which lie on opposite sides of the tooth supporting bar of the rake head, when the member is retracted and in which the bight portion of the member is formed with openings through which the rake teeth extend.

The invention further contemplates a rake tooth cleaner device which may be either incorporated as a part of the rake structure at the time of its manufacture or purchased as an attachment and applied by the purchaser to the rake.

The invention further embodies a rake tooth cleaning device including a manually operable stripper member and means for mounting and moving the stripper member to normally dispose the same in a retracted position adjacent the bases of the teeth.

The invention also aims to provide a rake tooth cleaning device which is comparatively simple and not complicated in its construction and may, therefore, be inexpensively produced, assembled and applied and which is highly efficient for its intended purpose.

With the above recited and other objects in view, reference is made to the following specification and accompanying drawing, in which several preferred embodiments of the invention are disclosed, while the claims are intended to cover other variations which fall within their scope.

In the drawing:

Fig. 1 is a perspective view of a rake equipped with a tooth cleaning device constructed in accordance with the invention.

Fig. 2 is a side view thereof on a larger scale illustrating respectively in full and broken lines, the normally retracted and extended positions of the stripper member.

Fig. 3 is a plan view of the blank from which the stripper member is formed.

Fig. 4 is a top edge view of the stripper member in its completely formed condition.

Fig. 5 is a front view of a modified form of the stripper member for use in connection with wooden toothed rakes, a part being broken away and shown in sections to disclose the underlying structure.

Fig. 6 is a side view of a spring tooth rake equipped with a modified form of a cleaning device especially designed for application to this type of rake and showing, respectively, in full and broken lines, the retracted and extended condition of the stripper member.

Referring to the drawing by characters of reference, A designates a rake handle, B the shank of the rake head which also includes a tooth supporting bar C and the rake teeth D.

The cleaning device, which may be sold separately as an attachment or produced coincident with the manufacture of the rake, essentially includes a stripping element designated generally by the reference character E and a means for mounting and moving said member over the length of the teeth from the bases or connected ends thereof to the outer free ends, which mounting and moving means is designated generally by the reference character F.

In the form of the invention illustrated in Figures 1 to 4 inclusive, the stripping member E is of cross sectional U-shaped or channeled configuration presenting inner and outer side walls 10 and 11 lying on opposite sides of the tooth supporting bar C when the stripper member is retracted as shown in full lines in Fig. 2 with a bight portion 12 connecting said walls, the bight portion being formed with openings 13 through which the rake teeth D extend. The stripper member mounting and movable means F consists of a flat leaf spring 14 which is carried by the rake handle and anchored thereto and which is connected at its opposite end to the stripper member E. As particularly illustrated in Figures 1 and 2, the leaf spring 14 is rolled upon itself at its anchored end to form an eye 15 which is disposed between the spaced, out-turned flanges or terminals 16 of a clip 17 which embraces the rake handle A, with a bolt 18 extending through the flanges or terminal 16 and the eye 15. A second bolt 19 extends through the flanges or terminals 16 and underlies the leaf spring 14 at a distance from its anchored end. As shown in Figures 1 and 2, the opposite end of the leaf spring 14 is rolled upon itself to form an eye 20 which has linked connection with the stripper member E, said linked connection consisting of a pair of rods 21 formed with upper terminal eyes 22 disposed at opposite sides of and in alignment with the terminal eye 20 with a bolt 23 extending through said eyes. The opposite terminals of the links 21 are formed with eyes 24 and the inner wall 10 of the stripper member E is provided with spaced pairs of pintle rolls 25 and 26, one of the eyes 24 of the links 21 being received between one pair of pintle rolls and the other of said eyes 24 being received between the other pair of pintle rolls, with a pintle 27 extending through each pair of rolls to establish a pivotal connection between the links and the stripper member E. The spacing of the pairs of pintle rolls 25 and 26 affords a clearance space whereby one pair of pintle rolls is disposed on one side of the shank B of the rake head and the other pair is disposed on the other side. Obviously, the inherent resiliency or spring action of the spring 14 effects a normal movement of the stripper member E to the retracted position shown in Fig. 1 and in full lines in Fig. 2. This disposes the stripper member adjacent the bases of the teeth D where the walls 10 and 11 lie on opposite sides of the tooth supporting bar C, thus locating the stripper member E in an out-of-the-way position to permit of the normal use of the rake. When leaves or other material are gathered on and between the rake teeth so as to clog the same, the user has only to manually flex the spring 14 to the broken line position, illustrated in Fig. 2, to effect the outward movement of the stripper member E over the teeth from the bases to the outer free ends, thereby dislodging and displacing from and between the teeth the material collected thereon. When the user releases the spring 14, which is under tension, it returns to its normal position and retracts the stripper element E.

While the stripper element may be produced in any suitable way, the same is preferably cut, bent and formed from a single blank of sheet material illustrated in Fig. 3. As shown, the blank is bent upwardly along parallel dotted lines 30 and 31 to provide the inner and outer side walls 10 and 11 and the bight portion 12 through which bight portion the rake receiving openings 13 are formed. If desired, the blank may have extended end portions 32 which are bent upwardly to provide end walls for the channel. The pairs of pintle rolls 25 and 26 are preferably formed as integral extensions of the inner wall 10.

Where the cleaning device is to be employed in connection with rakes having wooden teeth, the bight portion 35 of the stripper member is preferably formed with openings 36 from the edges of which openings cylindrical bosses 37 extend upwardly to provide a wide, smooth bearing surface to minimize wear on the wooden teeth.

In the form of the invention illustrated in Fig. 6 of the drawings, the tooth cleaning means is shown as applied to a spring tooth grass rake in which G represents the rake handle, H the rake head and I the spring teeth which extend outwardly in a plane coinciding with the rake head for a distance and then provided with downturned curved terminals J. In this form of rake, the cleaning device, of necessity, assumes a slightly different form as to the mounting and operating means, although the stripper member K is of substantially the same construction being substantially of cross sectional U-shaped configuration presenting upper and lower walls 40 and 41 joined by an apertured bight 42.

The mounting and operating means consists of a clip 43 anchored to the rake handle G with a manipulating lever 44 fulcrumed at 45 to the clip for swinging movement towards and away from the rake head. A link 46 is pivotally connected as at 47 to the stripper member K and pivotally connected as at 48 to the lever 44. When the lever is in the rearmost position illustrated in full lines in Fig. 6, the stripper member K is retracted to its normal position. When it becomes necessary to clean the rake teeth, the manipulating lever 44 is swung to the broken line position illustrated in Fig. 6 causing the stripper member K to move outwardly over the teeth I and permitting the same to follow the curvature of the terminals J which will be slightly sprung or distorted from their normal position to the broken line position designated. The stiffer member K is retracted by manually swinging the lever 44 back to the full line position shown.

What is claimed is:

1. A tooth cleaner attachment for hand rakes, including a stripper member mounted for slidable movement with reference to the teeth from the bases of the outer free ends thereof, said stripper member being of cross sectional channeled configuration presenting inner and outer side walls lying on opposite sides of the tooth supporting bar of the rake head when the member is retracted and a bight portion connecting said walls having openings through which the rake teeth extend, a flat leaf spring carried by the rake handle and means pivotally connected on horizontal axes to the outer end of said leaf spring and to the inner wall of said stripper member for effecting movement of said member with respect to the teeth.

2. A tooth cleaner attachment for hand rakes, including a stripper member mounted for slidable movement with reference to the teeth from the bases of the outer free ends thereof, said stripper member being of cross sectional channeled configuration presenting inner and outer side walls lying on opposite sides of the tooth supporting bar of the rake head when the member is retracted and a bight portion connecting said walls having openings through which the rake teeth extend, a flat leaf spring pivotally connected to the handle and means comprising a pair of rods disposed one on each side of the shank of the rake head pivotally connected at their upper ends to the outer end of said leaf spring and pivotally connected at their lower ends to one of the walls of said stripper member for effecting movement of said member with respect to the teeth.

3. A tooth cleaner attachment for rakes including a stripper member slidable over the length of the teeth, means for mounting and moving said member to normally dispose the same in a retracted position adjacent the bases of the teeth, said means comprising a yieldable resilient element connected to the stripper member and a clip embracing the handle and provided with spaced, flanged terminals between which the said resilient element is anchored and an element disposed between and connecting said flanged terminals and forming a fulcrum over which the resilient member is flexed.

ANDERS JOHAN WIKANDER.
HERBERT EDVARD OHRN.